(12) United States Patent
Prasad et al.

(10) Patent No.: US 12,614,027 B2
(45) Date of Patent: Apr. 28, 2026

(54) GENERATIVE ARTIFICIAL INTELLIGENCE BASED (GEN AI-BASED) CONTENT GENERATION SYSTEM AND METHOD FOR GENERATING PERSONA-BASED QUESTION ANSWERS TO OPTIMIZE USER EXPERIENCES

(71) Applicant: ALLOFUS AI INC., Wilmington, DE (US)

(72) Inventors: Ganesh Prasad, San Jose, CA (US); Aditi Viswanathan, San Francisco, CA (US); Christopher M. Tompkins, San Francisco, CA (US)

(73) Assignee: ALLOFUS AI INC.

( * ) Notice: Subject to any disclaimer, the term of this patent is extended or adjusted under 35 U.S.C. 154(b) by 260 days.

(21) Appl. No.: 18/640,026

(22) Filed: Apr. 19, 2024

(65) Prior Publication Data

US 2024/0354498 A1 Oct. 24, 2024

Related U.S. Application Data

(60) Provisional application No. 63/460,459, filed on Apr. 19, 2023.

(51) Int. Cl.
*G06F 40/20* (2020.01)
*G06Q 30/0601* (2023.01)

(52) U.S. Cl.
CPC ......... *G06F 40/20* (2020.01); *G06Q 30/0631* (2013.01)

(58) Field of Classification Search
CPC ............................ G06F 40/20; G06Q 30/0631
See application file for complete search history.

(56) References Cited

U.S. PATENT DOCUMENTS

| | | | | |
|---|---|---|---|---|
| 9,823,811 | B2 * | 11/2017 | Brown | ..................... G06F 9/453 |
| 10,694,038 | B2 * | 6/2020 | Abraham | ............ H04M 3/5166 |
| 2018/0293483 | A1 * | 10/2018 | Abramson | .............. H04L 51/02 |
| 2021/0382893 | A1 * | 12/2021 | Kumar | ................... G06N 3/045 |

* cited by examiner

*Primary Examiner* — Nicole A K Schmieder
(74) *Attorney, Agent, or Firm* — Jason C. Cameron

(57) ABSTRACT

An AI-based content generation method and system for generating persona-based question-answers based on personas and diversity of answers, is disclosed. The AI-based content generation method includes: obtaining inputs from electronic devices of first users; identifying second users based on criteria associated with inputs, by an AI model; generating information associated with the second users based on criteria associated with the inputs; generating confidence scores for the information associated with the second users based on attributes of the second users using the AI model; ranking the second users based on the generated confidence scores using the AI model; generating personas associated with optimized second user based on ranking of the second users using the AI model; automatically generating subsequent questions for the first users; and providing an output of generated personas associated with the optimized second user, with the persona-based answers, and the subsequent questions, to the first users.

14 Claims, 8 Drawing Sheets

100

104

400

First User

I am having problems with my teen daughter. She used to be a gem, but over the last two years is getting belligerent, does not respect me and my spouse, does not respect boundaries, is not communicating with us....help!

Dr. EFG

Clinical Professor of Psychiatry at the UCLA School of Medicine and Co-author of "The Whole-Brain Child"

"Use moments of conflict as opportunities to integrate your teen's developing brain, fostering mutual understanding and respect"

Add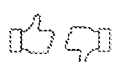

Dr. HIJ

Parenting educator and author of ""Queen Bees and Wannabes", focusing on teen dynamics and bullying "Open up a dialogue about your daughter's life, ensuring she feels heard and understood, while addressing disrespect calmly and firmly"

Add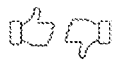

Dr. KLM

Clinical Psychologist and author of "Peaceful Parent Happy Kids: How to stop Yelling and start Connecting"

"Prioritize connecting with your teen and managing your emotions, using conflict as an opportunity to teach respect and empathy"

Add

Dr. XYZ

Pediatrician specializing in adolescent medicine and co-author of "Raising kids to Thrive: Balancing Love with Expectations and Protections with Trust"

"Emphasize the balance between love and expectations, fostering an environment where your teens feels trusted to make the right choices"

Add

Today

First User

502 — I am having problems with my teen daughter. She used to be a gem, but over the last two years is getting belligerent, does not respect me and my spouse, does not respect boundaries, is not communicating with us....help!

 Dr. ABCD          10:00 Am
Clinical Psychologist and Author

504 —
Understand that pushing against limits is a part of teenage development
As we navigate the often-turbulent waters of parenting teens, it's crucial to approach these challenges with a foundation of empathy. Recognizing that adolescents are in a phase of seeking independence can help us frame their behavior not as personal affronts as a natural part of their growth.
When we see our teenagers behaving in ways that concern us – becoming belligerent, disrespecting boundaries, or without communication – it's a signal for us to reassess not just their behavior but our responses to it. Emphasize clear communication and setting boundaries with love. This does not mean giving in or removing all rules; it means explaining the "why" behind your decisions and rules, offering them a sense of understanding and respect that they, in turn, can learn to mirror back to you....

506 —
How can I improve my communication with my teen daughter?

What strategies can I use to set effective boundaries with my teenager?

How can I show empathy to my daughter while still enforcing rules?

Today

First User

I am 21 and have dry skin.. Help me please! ———602

 Beauty Influencer
Beauty Mogul and founder of YouRBeautiful

604

Hey gorgeous! First, let me say, moisturizing is definitely important for dry skin. Since you're 21, you should look for a product that provides hydration and locks it in, while being gentle on the skin.

Start with a gentle cleanser that doesn't strip the skin of its essential oils. Next, introduce hyaluronic acid serum into your routine.

I would recommend Brand X Hydrating Serum for your dry skin. It's an amazing product that contains ceramides and hyaluronic acid to help retain your skin's natural moisture. It's also non-comedogenic, which means it won't clog your pores, and it's fragrance-free, making it suitable for even sensitive skin types.

606

Where can I buy the Brand X Serum?

How often should I apply the Brand X Serum for the best results?

Can you recommend a moisturizer to pair with the Brand X Serum?

FIG. 6

ANALYZE ONE OR MORE OBJECTIVES OF THE ONE OR MORE FIRST USERS BASED ON ONE OR MORE PERSONA-BASED ANSWERS GENERATED FOR THE ONE OR MORE QUESTIONS ⌐714

AUTOMATICALLY GENERATE ONE OR MORE SUBSEQUENT QUESTIONS FOR THE ONE OR MORE FIRST USERS TO PURSUE AN INTERACTION BETWEEN THE ONE OR MORE PERSONAS AND THE ONE OR MORE FIRST USERS, BASED ON THE ANALYSIS OF ONE OR MORE OBJECTIVES OF THE ONE OR MORE FIRST USERS BY THE ONE OR MORE PERSONAS AND THE ARTIFICIAL INTELLIGENCE BASED (AI-BASED) CONTENT GENERATION SYSTEM ⌐716

PROVIDE AN OUTPUT OF AT LEAST ONE OF: THE GENERATED ONE OR MORE PERSONAS ASSOCIATED WITH THE OPTIMIZED, SECOND USER WITH THE ONE OR MORE PERSONA-BASED ANSWERS, THE ONE OR MORE SUBSEQUENT QUESTIONS, AND THE DIVERSITY OF ONE OR MORE PERSONAS BASED ON A DIVERSITY OF THE ONE OR MORE SECOND USERS, TO THE ONE OR MORE FIRST USERS THROUGH ONE OR MORE USER INTERFACES ASSOCIATED WITH THE ONE OR MORE ELECTRONIC DEVICES ⌐718

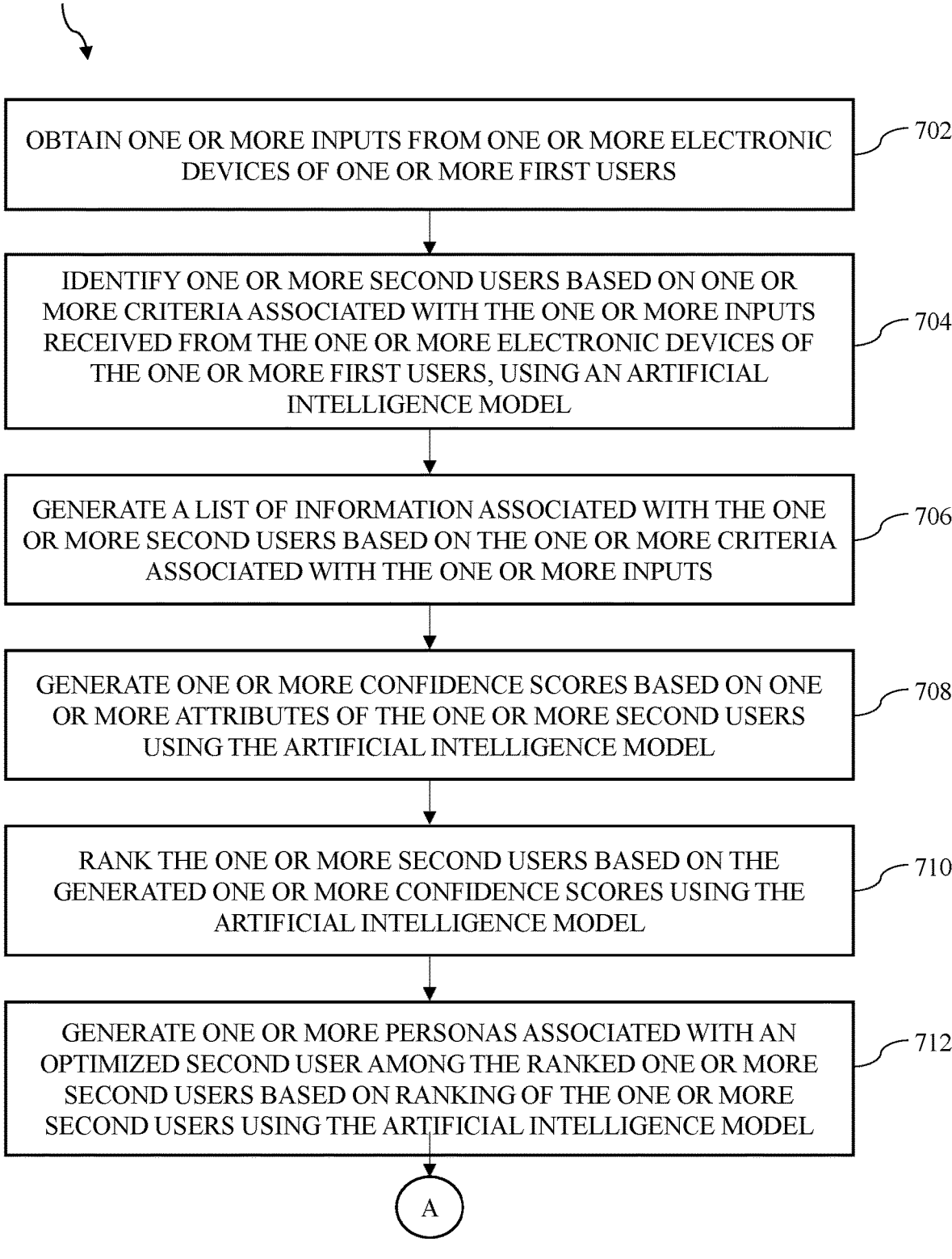

702 — OBTAIN ONE OR MORE INPUTS FROM ONE OR MORE ELECTRONIC DEVICES OF ONE OR MORE FIRST USERS

704 — IDENTIFY ONE OR MORE SECOND USERS BASED ON ONE OR MORE CRITERIA ASSOCIATED WITH THE ONE OR MORE INPUTS RECEIVED FROM THE ONE OR MORE ELECTRONIC DEVICES OF THE ONE OR MORE FIRST USERS, USING AN ARTIFICIAL INTELLIGENCE MODEL

706 — GENERATE A LIST OF INFORMATION ASSOCIATED WITH THE ONE OR MORE SECOND USERS BASED ON THE ONE OR MORE CRITERIA ASSOCIATED WITH THE ONE OR MORE INPUTS

708 — GENERATE ONE OR MORE CONFIDENCE SCORES BASED ON ONE OR MORE ATTRIBUTES OF THE ONE OR MORE SECOND USERS USING THE ARTIFICIAL INTELLIGENCE MODEL

710 — RANK THE ONE OR MORE SECOND USERS BASED ON THE GENERATED ONE OR MORE CONFIDENCE SCORES USING THE ARTIFICIAL INTELLIGENCE MODEL

712 — GENERATE ONE OR MORE PERSONAS ASSOCIATED WITH AN OPTIMIZED SECOND USER AMONG THE RANKED ONE OR MORE SECOND USERS BASED ON RANKING OF THE ONE OR MORE SECOND USERS USING THE ARTIFICIAL INTELLIGENCE MODEL

GENERATIVE ARTIFICIAL INTELLIGENCE BASED (GEN AI-BASED) CONTENT GENERATION SYSTEM AND METHOD FOR GENERATING PERSONA-BASED QUESTION ANSWERS TO OPTIMIZE USER EXPERIENCES

CROSS REFERENCE TO RELATED APPLICATION(S)

This application claims the priority to incorporates by reference the entire disclosure of U.S. provisional patent application No. 63/460,459 filed on Apr. 19, 2023 titled "A method to make Generative AI user journeys more helpful, engaging, and delightful by using people and organizations as personas to answer questions, providing a real face to the answers, a diversity of opinions attributed to specific personas and attributing and rewarding creators for their content in an LLM".

FIELD OF INVENTION

Embodiments of the present disclosure relate to artificial intelligence based systems, and more particularly relate to an artificial intelligence based (AI-based) content generation system and method for generating one or more persona-based question answers based on experts to improve user experiences.

BACKGROUND

Generative artificial intelligence (AI) systems powered by Large Language Models (LLMs) have emerged as powerful tools for generating human-like text across various domains. The generative AI systems exemplified by ChatGPT®, GPT?, LaMDA®, Gemini®, Claude, Llama, Mistral, and the like, represent a significant leap forward in natural language processing technology. By training on vast datasets sourced from an internet, the generative AI systems may understand and generate responses to user queries, providing solutions, explanations, and even creative content. Nevertheless, the generative AI systems excel in synthesizing information from diverse sources, the generative AI systems lack transparency and fail to acknowledge the contributions of content creators whose data they are built upon.

Traditional methods of employing the generative AI systems are largely focused on the generation of the responses without emphasizing the attribution of the content creators. In these approaches, the emphasis is primarily on the functionality and performance of artificial intelligence (AI) models rather than on the transparency or diversity of the generated content. Users interact with the generative AI systems without a clear understanding of where the information is sourced from, where the answer is coming from, who is answering their question, what are other opinions and perspectives, leading to detached and impersonal experience.

One common approach is to train the generative AI systems on the large datasets compiled from various sources including at least one of: websites, books, articles, and the like, to develop a broad understanding of language and context. The large datasets sometimes are anonymized and aggregated, with little to no explicit attribution to the original creators of the content. As a result, the users receive the responses that are disconnected from the original sources, lacking context or indication of authorship, and lacking the human element and relatability in the answers.

Moreover, the traditional methods prioritize efficiency and scalability, leading to the standardized responses that may lack the nuanced perspectives and diversity of opinions found in the human-generated content. The focus is on generating a mean (average of many perspectives) answer to the user queries rather than providing a rich and multifaceted view of the topic at hand. Follow-up questions and interactions with the generative AI system are limited to predefined prompts and commands, restricting the depth of engagement and exploration for the users.

Additionally, the traditional methods may overlook the contributions of the content creators by treating the content as interchangeable components within the training data. Without clear attribution and compensation mechanisms, the content creators may feel undervalued and disincentivized from continuing their content creation efforts. This lack of recognition may hinder the growth of a vibrant and diverse content ecosystem, limiting the variety and quality of the content available for training the generative AI systems.

In the existing technology, a method and apparatus for providing the responses to the users is disclosed. The method involves providing the responses to the user in a question-and-answer session through various steps: (a) receiving a message from the user, (b) extracting the context information, (c) obtaining fact and emotion information, (d) generating the response through reasoning with a focus vector using a reasoning model, and (c) providing the response to the user. The context information is extracted from a database, while the fact and emotion information are derived from the message. The response generation involves multiple rounds of reasoning with the focus on the provided facts and the associated emotions and updating the focus vector in each round. Finally, the response is delivered to the user by an electronic conversation agent. Nevertheless, the method may not effectively address the need for diversity in the responses, as the method primarily focuses on reasoning with a given set of the facts and emotions rather than integrating multiple perspectives from the different content creators. Furthermore, the absence of mechanisms for recognizing and compensating the content creators means that the method may not incentivize continued content creation and provide adequate recognition for their contributions.

There are various technical problems with traditional methods in the prior art. In the existing technology, the users of the generative AI systems encounter several challenges that hinder an experience of the users. Firstly, the users struggle to understand the origins of the responses provided by the generative AI systems. Without clear attribution, the users may find it difficult to trust the information presented to them, leading to skepticism and uncertainty. Additionally, the lack of diversity in the responses limit an exposure of the users to different perspectives and solutions, hampering their ability to make informed decisions. Furthermore, navigating the generative AI systems proves challenging for many users, as formulating the effective queries and generating meaningful follow-up questions require a nuanced understanding of the underlying technology.

The content creators whose data contribute to the training of the generative AI systems, face their own set of challenges. One significant issue is the lack of attribution for the contributions of the content creators. As the content gets integrated into the larger dataset used to train the LLMs, voices of the content creators are lost, leading to a loss of their recognition and visibility. Moreover, the absence of the compensation mechanisms deprives the content creators of incentives to continue producing the valuable content. Additionally, the content creators struggle with maintaining ownership and protection of their original ideas, as the contributions become part of a vast pool of the data without clear boundaries and safeguards.

Hence, there is a need for an improved artificial intelligence based (AI-based) content generation system and method for generating one or more persona-based question answers to optimize user experiences, add the essential human element to the answers so users can recognize the source of the answers and relate to the answers as well as to provide a mechanism to attribute, recognize and reward the creators, and provide a diversity of sources and voices, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, an artificial intelligence based (AI-based) content generation method for generating one or more persona-based question answers to optimize user experiences is disclosed. The artificial intelligence based (AI-based) content generation method comprises obtaining, by one or more hardware processors, one or more inputs from one or more electronic devices of one or more first users. The one or more inputs comprise one or more information related to one or more questions from the one or more first users.

The artificial intelligence based (AI-based) content generation method further comprises identifying, by the one or more hardware processors, one or more second users based on one or more criteria associated with the one or more inputs received from the one or more electronic devices of the one or more first users, by an artificial intelligence model. The one or more second users are one or more experts responding with one or more persona-based answers to the one or more questions provided by the one or more first users. The one or more criteria associated with the one or more inputs comprise at least one of: expertise of the one or more second users to answer to the one or more questions, one or more written or published materials of the one or more second users in support of the one or more questions, popularity of the one or more second users, and ratings of the one or more second users based on historical interactions with the one or more first users in answering the one or more questions.

The artificial intelligence based (AI-based) content generation method further comprises generating, by the one or more hardware processors, a list of information associated with the one or more second users based on the one or more criteria associated with the one or more inputs. The list of information associated with the one or more second users comprise at least one of: one or more identical persona-based answers to the one or more questions and one or more different persona-based answers to the one or more questions, to provide a diversity of perspectives and opinions to the one or more first users.

The artificial intelligence based (AI-based) content generation method further comprises generating, by the one or more hardware processors, one or more confidence scores for the list of information associated with the one or more second users based on one or more attributes of the one or more second users using the artificial intelligence model. The one or more attributes of the one or more second users comprise at least one of: expertise of the one or more second users to answer the one or more questions of the one or more first users, one or more explicit preferences of inclusion and exclusion of the one or more second users set by the one or more first users, an implicit preferences of the one or more first users learned by the artificial intelligence model, one or more goals and values of at least one of: one or more organizations and the one or more experts, one or more guidelines set by the one or more organizations, and one or more optimized practices in the one or more organizations.

The artificial intelligence based (AI-based) content generation method further comprises ranking, by the one or more hardware processors, the one or more second users based on the generated one or more confidence scores using the artificial intelligence model.

The artificial intelligence based (AI-based) content generation method further comprises generating, by the one or more hardware processors, one or more personas associated with an optimized second user among the ranked one or more second users based on ranking of the one or more second users using the artificial intelligence model. The generated one or more personas associated with the optimized second user comprises the one or more persona-based answers corresponding to the one or more questions, and wherein the one or more persona-based answers are generated based on the content of the one or more second users and in at least one of: voice, tone, and style, of the one or more optimized second user.

The artificial intelligence based (AI-based) content generation method further comprises analyzing, by the one or more hardware processors, one or more objectives of the one or more first users based on the one or more persona-based answers generated for the one or more questions.

The artificial intelligence based (AI-based) content generation method further comprises automatically generating, by the one or more hardware processors, one or more subsequent questions for the one or more first users to pursue an interaction between the one or more personas and the one or more first users, based on the analysis of one or more objectives of the one or more first users by the one or more personas and the artificial intelligence based (AI-based) content generation system.

The artificial intelligence based (AI-based) content generation method further comprises providing, by the one or more hardware processors, an output of at least one of: the generated one or more personas associated with the optimized second user, with the one or more persona-based answers, the one or more subsequent questions, and the diversity of the one or more personas based on a diversity of the one or more second users, to the one or more first users through one or more user interfaces associated with the one or more electronic devices.

In an embodiment, the artificial intelligence based (AI-based) content generation method further comprises training, by the one or more hardware processors, the artificial intelligence (AI) model, by: (a) obtaining, by the one or more hardware processors, one or more data from one or more data sources comprising at least one of: one or more books, one or more multimedia contents, one or more articles, one or more blog posts, one or more social media posts, and one or more websites, wherein the one or more data comprise at least one of: one or more titles, one or more authors associated with the one or more second users, and one or more contents; and (b) training, by the one or more hardware processors, the artificial intelligence (AI) model on the obtained one or more data using a learning algorithm.

In another embodiment, the artificial intelligence based (AI-based) content generation method further comprises (a) fine-tuning, by the one or more hardware processors, the trained artificial intelligence (AI) model on one or more task-specific datasets associated with the one or more data to optimize performance of the artificial intelligence (AI) model; and (b) evaluating, by the one or more hardware processors, the trained artificial intelligence (AI) model to assess capabilities of the artificial intelligence (AI) model in at least one of: identifying the one or more second users, generating the one or more subsequent questions, and generating the one or more personas associated with the one or more second users, with one or more persona-based answers for the one or more questions.

In yet another embodiment, the artificial intelligence based (AI-based) content generation method further comprises (a) upon analyzing the one or more objectives of the one or more first users, recommending, by the one or more hardware processors, one or more actions associated with the one or more objectives of the one or more first users, based on an interaction between the one or more personas and the one or more first users; (b) monitoring, by the one or more hardware processors, the one or more actions performed by the one or more first users; and (c) updating, by the one or more hardware processors, the one or more actions associated with the one or more objectives of the one or more first users, based on one or more feedback received from the one or more first users.

In yet another embodiment, the artificial intelligence based (AI-based) content generation method further comprises controlling, by the one or more hardware processors, one or more performances and outputs, associated with the artificial intelligence model.

In yet another embodiment, controlling the one or more performances and outputs, associated with the artificial intelligence model, comprises at least one of: (a) providing, by the one or more hardware processors, transparency of the one or more personas associated with the one or more second users, to the one or more first users; (b) determining, by the one or more hardware processors, whether at least one of: the one or more persona-based answers are in compliance with one or more answers published by the one or more second users, and the one or more persona-based answers are in at least one of: the voice, the tone, and the style, of the one or more optimized second user; (c) controlling, by the one or more hardware processors, one or more performances of the one or more personas, wherein controlling the one or more performances of the one or more personas comprises constraining the one or more personas to provide information associated with the one or more persona-based answers to the one or more first users; (d) optimizing, by the one or more hardware processors, the one or more personas based on one or more updated information provided by the one or more second users using at least one of: fine-tuning the artificial intelligence model and configuring one or more techniques comprising Retrieval Augmented Generation (RAG) technique; (e) filtering, by the one or more hardware processors, the one or more subsequent questions that are incompliant to one or more acceptable standard criteria; (f) determining, by the one or more hardware processors, whether one or more benefits are provided to the one or more first users based on at least one of: modifications of the one or more subsequent questions and one or more user controls; (g) determining, by the one or more hardware processors, whether the one or more performances of the artificial intelligence model are in control based on one or more feedback received from at least one of: the one or more first users and the one or more second users. The one or more first users comprise one or more end users receiving the one or more persona-based answers based on the one or more questions. The one or more second users comprise one or more creators creating one or more contents associated with the one or more persona-based answers.

In yet another embodiment, the artificial intelligence based (AI-based) content generation method further comprises (a) determining, by the one or more hardware processors, whether the one or more questions and the corresponding one or more persona-based answers meet one or more current and future safety and trust expectations of an artificial intelligence based (AI-based) content generation system to provide security to at least one of: the one or more first users and the one or more second users; and (b) creating, by the one or more hardware processors, a trusted connection with the one or more first users, guiding the one or more first users and utilizing the one or more personas of the one or more second users, to influence, recommend and close a sale of one or more products and services, based on the one or more personas and trained data associated with preferences and problems associated with the one or more first users.

In one aspect, an artificial intelligence based (AI-based) content generation system for generating one or more persona-based question answers to optimize user experiences, is disclosed. The artificial intelligence based (AI-based) content generation system includes one or more hardware processors and a memory coupled to the one or more hardware processors. The memory includes a plurality of subsystems in the form of programmable instructions executable by the one or more hardware processors.

The plurality of subsystems comprises an input obtaining subsystem configured to obtain one or more inputs from one or more electronic devices of one or more first users. The one or more inputs comprise one or more information related to one or more questions from the one or more first users.

The plurality of subsystems further comprises an user and creator identifying subsystem configured to identify the user based on their explicit or implicit profile and preferences, identify one or more second users based on one or more criteria associated with the one or more inputs received from the one or more electronic devices of the one or more first users, by an artificial intelligence model. The one or more second users are one or more experts responding with one or more persona-based answers to the one or more questions provided by the one or more first users. The one or more criteria associated with the one or more inputs comprise at least one of: expertise of the one or more second users to answer to the one or more questions, one or more written materials of the one or more second users in support of the one or more questions, popularity of the one or more second users, and ratings of the one or more second users based on historical interactions with the one or more first users in answering the one or more questions.

The plurality of subsystems further comprises an information generation subsystem configured to generate a list of information associated with the one or more second users based on the one or more criteria associated with the one or more inputs. The list of information associated with the one or more second users comprise at least one of: one or more identical persona-based answers to the one or more questions and one or more different persona-based answers to the one or more questions. Augmentation of the creators knowledge with up-to-date information via techniques including Retrieval Augmented Generation (RAG) may be performed in the information generation subsystem.

The plurality of subsystems further comprises a confidence score generation subsystem configured to generate one or more confidence scores for the list of information associated with the answer to the user's questions from one or more second users based on one or more attributes of the one or more second users using the artificial intelligence model. The one or more attributes of the one or more second users comprise at least one of: expertise of the one or more second users to answer the one or more questions of the one or more first users, one or more explicit preferences of inclusion and exclusion of the one or more second users set by the one or more first users, an implicit preferences of the one or more first users learned by the artificial intelligence model, one or more goals and values of at least one of: one or more organizations and the one or more experts, one or more guidelines set by the one or more organizations, and one or more optimized practices in the one or more organizations.

The plurality of subsystems further comprises a ranking subsystem configured to rank the one or more second users and their answers based on the generated one or more confidence scores using the artificial intelligence model.

The plurality of subsystems further comprises a persona generation subsystem configured to generate one or more personas associated with an optimized second user among the ranked one or more second users based on ranking of the one or more second users using the artificial intelligence model. The generated one or more personas associated with the optimized second user comprises the one or more persona-based answers corresponding to the one or more questions, and wherein the one or more persona-based answers are generated based on the content of the one or more second users and in at least one of: voice, tone, and style, of the one or more optimized second user.

The plurality of subsystems further comprises an objective analyzing subsystem configured to analyze one or more objectives of the one or more first users based on the one or more persona-based answers generated for the one or more questions.

The plurality of subsystems further comprises a question generation subsystem configured to automatically generate one or more subsequent questions for the one or more first users to continue to pursue an interaction between the one or more personas and the one or more first users, based on the analysis of one or more objectives of the one or more first users by the one or more personas and the artificial intelligence based (AI-based) content generation system.

The plurality of subsystems further comprises an output subsystem configured to provide an output of at least one of: the generated one or more personas associated with the optimized second user, with the one or more persona-based answers, the one or more subsequent questions, and the diversity of the one or more personas based on a diversity of the one or more second users, to the one or more first users through one or more user interfaces associated with the one or more electronic devices.

In another aspect, a non-transitory computer-readable storage medium having instructions stored therein that, when executed by a hardware processor, causes the processor to perform method steps as described above.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which:

FIG. 4 is an exemplary view of a user interface depicting a list of information associated with one or more second users, being generated based on one or more criteria associated with one or more questions, in accordance with an embodiment of the present disclosure;

FIG. 5 is an exemplary view of a user interface depicting that one or more persona provide one or more persona-based answers to one or more first users, in accordance with an embodiment of the present disclosure;

FIG. 6 is an exemplary view of a user interface depicting that one or more persona provide one or more persona-based answers to the one or more first users for creating a trusted connection with the one or more first users, in accordance with an embodiment of the present disclosure; and FIG. 7 is a flow chart illustrating an artificial intelligence based (AI-based) content generation method for generating the one or more persona-based question answers to optimize the user experiences, in accordance with an embodiment of the present disclosure.

Figure 1:
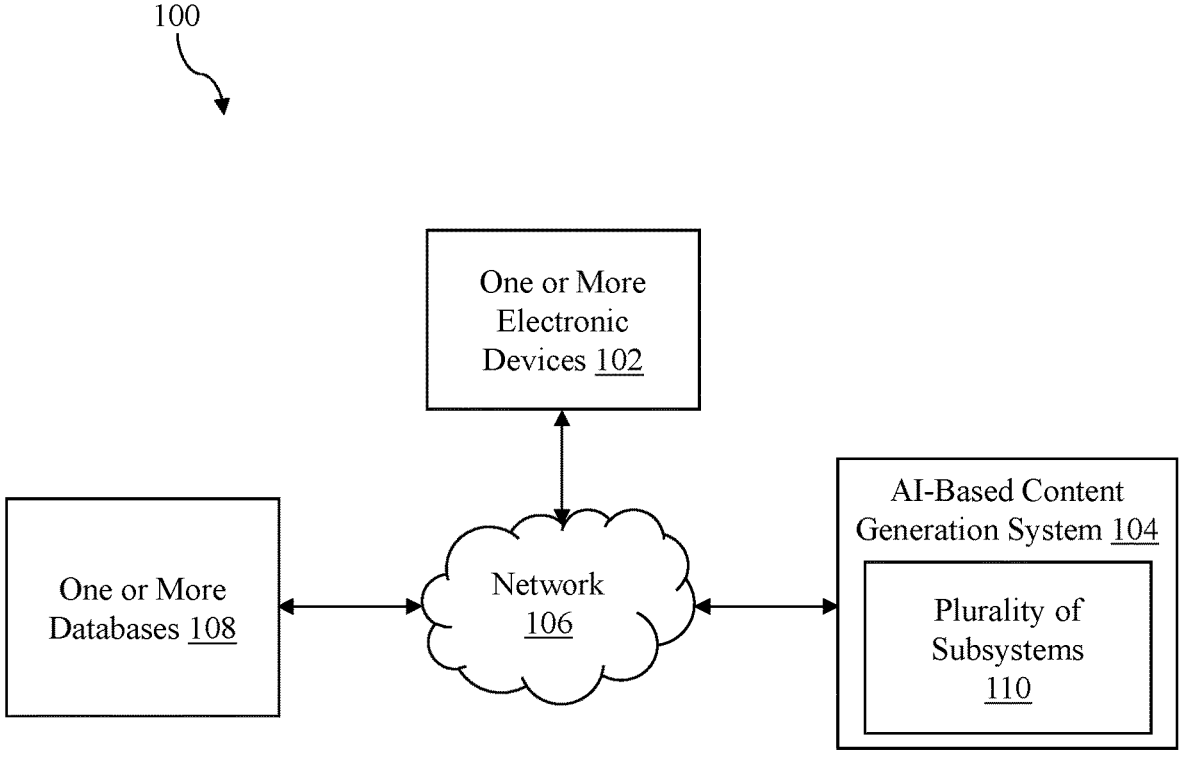
FIG. 1 is a block diagram illustrating a computing environment with an artificial intelligence based (AI-based) content generation system for generating one or more persona-based question answers to optimize user experiences, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed, permanently configured (hardwired) or temporarily configured (programmed) to operate in a certain manner and/or to perform certain operations described herein.

Referring now to the drawings, and more particularly to FIG. 1 through FIG. 6, where similar reference characters denote corresponding features consistently throughout the figures, there are shown preferred embodiments and these embodiments are described in the context of the following exemplary system and/or method.

FIG. 1 is a block diagram illustrating a computing environment 100 with an artificial intelligence based (AI-based) content generation system 104 (i.e., a generative artificial intelligence based (Gen AI-based) content generation system) for generating one or more persona-based question answers to optimize user experiences, in accordance with an embodiment of the present disclosure. According to FIG. 1, the computing environment 100 includes one or more electronic devices 102 that are communicatively coupled to the artificial intelligence based (AI-based) content generation system 104 through a network 106. The one or more electronic devices 102 through which one or more first users provide one or more inputs to the artificial intelligence based (AI-based) content generation system 104. In an embodiment, the one or more first users may include one or more end users receiving the one or more persona-based answers based on the one or more questions. In an embodiment, the terms one or more first users and the one or more end users may be used in the description interchangeably.

The present invention is configured to provide one or more persona-based answers to the one or more first users based on one or more questions provided by the one or more first users. The artificial intelligence based (AI-based) content generation system 104 is initially configured to obtain one or more inputs from the one or more electronic devices 102 of the one or more first users. In an embodiment, the one or more inputs may include one or more information related to one or more questions from the one or more one or more first users.

The artificial intelligence based (AI-based) content generation system 104 is further configured to identify one or more second users based on one or more criteria associated with the one or more inputs received from the one or more electronic devices 102 of the one or more first users, by an artificial intelligence model. In an embodiment, the one or more second users may include one or more creators/content creators creating one or more contents associated with the one or more persona-based answers. In an embodiment, the terms one or more second users and the one or more creators may be used in the description interchangeably. In an embodiment, the one or more second users are one or more experts (e.g., individual content creators or organizations under which the content creators are working with or associated with, or content published in the name of the organizations) responding with one or more persona-based answers to the one or more questions provided by the one or more first users. In an embodiment, the one or more criteria associated with the one or more inputs may include at least one of: expertise of the one or more second users to answer to the one or more questions, one or more written materials of the one or more second users in support of the one or more questions, popularity of the one or more second users, explicit or learned preferences of users, and ratings of the one or more second users based on historical interactions with the one or more first user in answering the one or more questions.

The artificial intelligence based (AI-based) content generation system 104 is further configured to generate a list of information associated with the one or more second users based on the one or more criteria associated with the one or more inputs. In an embodiment, the list of information associated with the one or more second users may include at least one of: one or more identical persona-based answers to the one or more questions and one or more different persona-based answers to the one or more questions. In an embodiment, the list of information with similar or different perspectives/answers may have diversity criteria that may meet a goal of a wide range of answers including but not limited to: differing opinions, differing styles, surprising answers, delightful answers, and the like.

The artificial intelligence based (AI-based) content generation system 104 is further configured to generate one or more confidence scores based on one or more attributes of the one or more second users using the artificial intelligence model. In an embodiment, the one or more attributes of the one or more second users may include at least one of: (a) expertise of the one or more second users to answer the one or more questions of the one or more first users, (b) one or more explicit preferences of inclusion and exclusion of the one or more second users set by the one or more first users, (c) an implicit preferences of the one or more first users learned by the artificial intelligence model, (d) one or more goals and values of at least one of: one or more organizations and one or more experts, (c) one or more guidelines set by the one or more organizations, and (f) one or more optimized practices in the one or more organizations.

The artificial intelligence based (AI-based) content generation system 104 is further configured to rank the one or more second users based on the generated one or more confidence scores using the artificial intelligence model. The artificial intelligence based (AI-based) content generation system 104 is further configured to generate one or more personas associated with the optimized second user among the ranked one or more second users based on ranking of the one or more second users using the artificial intelligence model. In an embodiment, the generated one or more personas associated with the optimized second user may include the one or more persona-based answers corresponding to the one or more questions. In another embodiment, the one or more persona-based answers are generated in at least one of: voice, tone, and style, of the one or more optimized second user.

The artificial intelligence based (AI-based) content generation system 104 is further configured to analyze one or more objectives of the one or more first users based on the one or more persona-based answers generated for the one or more questions. The artificial intelligence based (AI-based) content generation system 104 is further configured to automatically generate one or more subsequent questions for the one or more first users to pursue an interaction between the one or more personas and the one or more first users, based on the analysis of one or more objectives of the one or more first users. The artificial intelligence based (AI-based) content generation system 104 is further configured to provide an output of at least one of: the generated one or more personas associated with the optimized second user, with the one or more persona-based answers, the one or more subsequent questions, and the diversity of the one or more personas based on a diversity of the one or more second users, to the one or more first users through one or more user interfaces associated with the one or more electronic devices 102.

The artificial intelligence based (AI-based) content generation system 104 may be hosted on a central server including at least one of: a cloud server or a remote server. In an embodiment, the artificial intelligence based (AI-based) content generation system 104 may include at least one of: a user device, a server computer, a server computer over the network 106, a cloud-based content generation system, a cloud-based content generation system over the network 106, a distributed content generation system, and the like. Further, the network 106 may be at least one of: a Wireless-Fidelity (Wi-Fi) connection, a hotspot connection, a Bluetooth connection, a local area network (LAN), a wide area network (WAN), any other wireless network, and the like. In an embodiment, the one or more electronic devices 102 may include at least one of: a laptop computer, a desktop computer, a tablet computer, a Smartphone, a wearable device, a Smart watch, a Robot, and the like.

Further, the computing environment 100 includes one or more databases 108 communicatively coupled to the artificial intelligence based (AI-based) content generation system 104 through the network 106. In an embodiment, the one or more databases 108 include at least one of: one or more relational databases, one or more object-oriented databases, one or more data warehouses, one or more cloud-based databases, and the like. Furthermore, the one or more first electronic devices 102 may include at least one of: a local browser, a mobile application, and the like.

Furthermore, the one or more first users may use a web application through the local browser, the mobile application to communicate with the artificial intelligence based (AI-based) content generation system 104. In an embodiment of the present disclosure, the artificial intelligence based (AI-based) content generation system 104 includes a plurality of subsystems 110. Details on the plurality of subsystems 110 have been elaborated in subsequent paragraphs of the present description with reference to FIG. 2.

Figure 2:
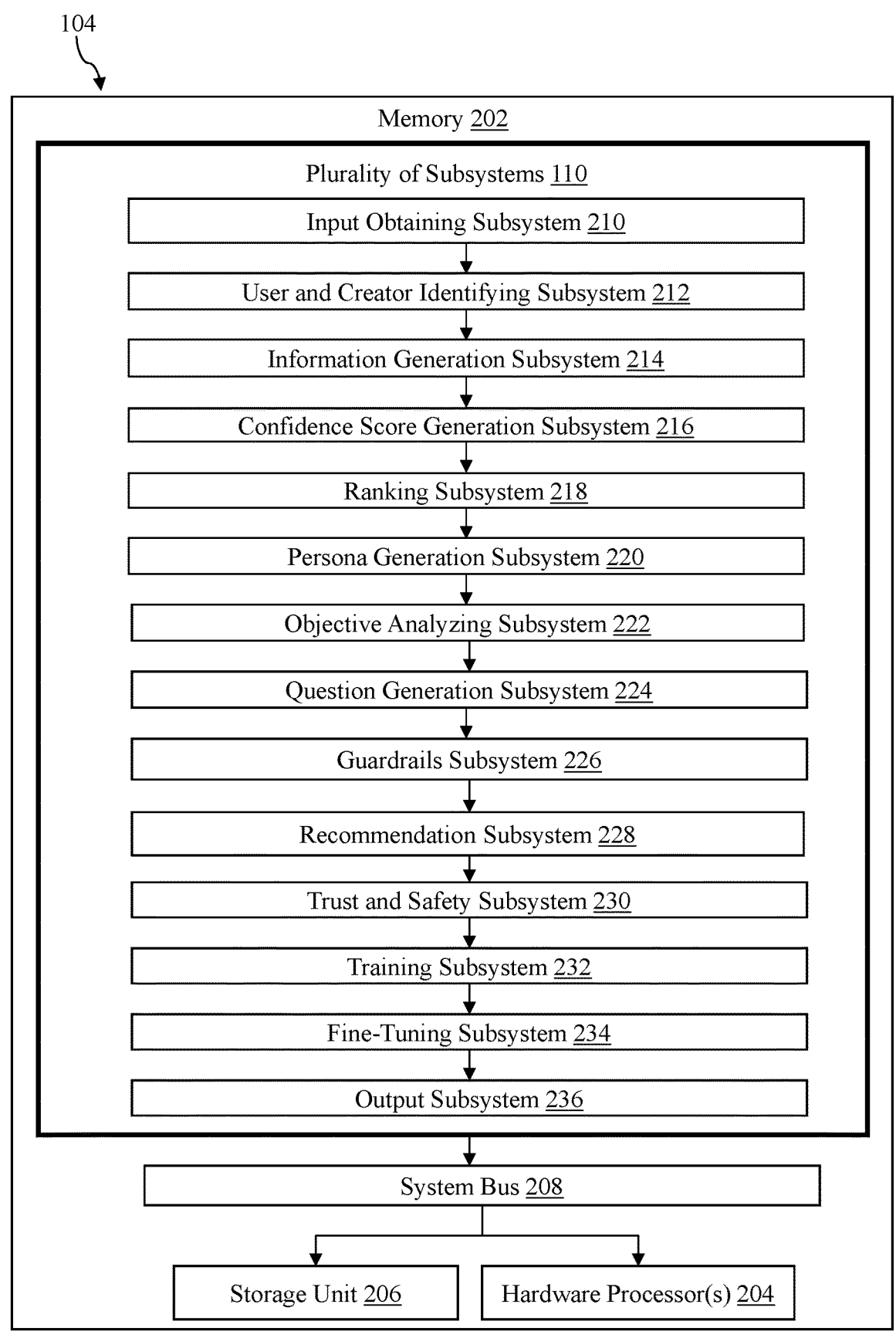
FIG. 2 is a detailed view of the artificial intelligence based (AI-based) content generation system for generating the one or more persona-based question answers to optimize the user experiences, in accordance with another embodiment of the present disclosure.

FIG. 2 is a detailed view of the artificial intelligence based (AI-based) content generation system 104 for generating the one or more persona-based question answers to optimize the user experiences, in accordance with another embodiment of the present disclosure. The artificial intelligence based (AI-based) content generation system 104 includes a memory 202, one or more hardware processors 204, and a storage unit 206. The memory 202, the one or more hardware processors 204, and the storage unit 206 are communicatively coupled through a system bus 208 or any similar mechanism. The memory 202 includes the plurality of subsystems 110 in the form of programmable instructions executable by the one or more hardware processors 204.

The plurality of subsystems 110 includes an input obtaining subsystem 210, an user and creator identifying subsystem 212, an information generation subsystem 214, a confidence score generation subsystem 216, a ranking subsystem 218, a persona generation subsystem 220, an objective analyzing subsystem 222, a question generation subsystem 224, a guardrails subsystem 226, a recommendation subsystem 228, a trust and safety subsystem 230, a training subsystem 232, a fine-tuning subsystem 234, and an output subsystem 236. The brief details of the plurality of subsystems 110 have been elaborated in a below table.

The one or more hardware processors 204, as used herein, means any type of computational circuit, including, but not limited to, at least one of: a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 204 may also include embedded controllers, including at least one of: generic or programmable logic devices or arrays, application specific integrated circuits, single-chip computers, and the like.

The memory 202 may be non-transitory volatile memory and non-volatile memory. The memory 202 may be coupled for communication with the one or more hardware processors 204, being a computer-readable storage medium. The one or more hardware processors 204 may execute machine-readable instructions and/or source code stored in the memory 202. A variety of machine-readable instructions may be stored in and accessed from the memory 202. The memory 202 may include any suitable elements for storing data and machine-readable instructions, including at least one of: read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 202 includes the plurality of subsystems 110 stored in the form of machine-readable instructions on any of the above-mentioned storage media and may be in communication with and executed by the one or more hardware processors 204.

The storage unit 206 may be a cloud storage, a Structured Query Language (SQL) data store, a noSQL database or a location on a file system directly accessible by the plurality of subsystems 110.

The plurality of subsystems 110 includes the input obtaining subsystem 210 that is communicatively connected to the one or more hardware processors 204. The input obtaining subsystem 210 is configured to obtain the one or more inputs from the one or more electronic devices 102 of one or more first users. In an embodiment, the one or more inputs may include the one or more information related to the one or more questions from the one or more first users.

The plurality of subsystems 110 includes the user and creator identifying subsystem 212 that is communicatively connected to the one or more hardware processors 204. The user and creator identifying subsystem 212 is configured to identify the one or more second users based on the one or more criteria associated with the one or more inputs received from the one or more electronic devices 102 of the one or more first users, by the artificial intelligence model. In an embodiment, the one or more second users are one or more experts (e.g., the content creators and the organizations under which the content creators are working with) responding with the one or more persona-based answers to the one or more questions provided by the one or more first users. In another embodiment, the one or more criteria associated with the one or more inputs may include at least one of: the expertise of the one or more second users to answer to the one or more questions, the one or more written materials of the one or more second users in support of the one or more questions, popularity of the one or more second users, and the ratings of the one or more second users based on historical interactions with the one or more first users in answering the one or more questions. The user and creator identifying subsystem 212 is configured to allow for the personalization and retrieval of the users' preferences too. The users' preferences may be explicitly stated or implicitly learned by the artificial intelligence model.

The plurality of subsystems 110 includes the information generation subsystem 214 that is communicatively connected to the one or more hardware processors 204. The information generation subsystem 214 is configured to generate the list of information associated with the one or more second users based on the one or more criteria associated with the one or more inputs. In an embodiment, the list of information associated with the one or more second users may include at least one of: the one or more identical persona-based answers to the one or more questions and the one or more different persona-based answers to the one or more questions. In an embodiment, the list of information with similar or different perspectives/answers may have the diversity criteria that may meet the goal of the wide range of answers including but not limited to: differing opinions, differing styles, surprising answers, delightful answers, and the like.

The plurality of subsystems 110 includes the confidence score generation subsystem 216 that is communicatively connected to the one or more hardware processors 204. The confidence score generation subsystem 216 is configured to generate the one or more confidence scores based on the one or more attributes of the one or more second users using the artificial intelligence model. In an embodiment, the one or more attributes of the one or more second users may include at least one of: (a) the expertise of the one or more second users to answer the one or more questions of the one or more first users, (b) the one or more explicit preferences of inclusion and exclusion of the one or more second users set by the one or more first users, (c) the implicit preferences of the one or more first users learned by the artificial intelligence model, (d) the one or more goals and values of at least one of: the one or more organizations and the one or more experts, (e) the one or more guidelines set by the one or more organizations, and (f) the one or more optimized practices in the one or more organizations.

The plurality of subsystems 110 includes the ranking subsystem 218 that is communicatively connected to the one or more hardware processors 204. The ranking subsystem 218 is configured to rank the one or more second users based on the generated one or more confidence scores using the artificial intelligence model.

The plurality of subsystems 110 includes the persona generation subsystem 220 that is communicatively connected to the one or more hardware processors 204. The persona generation subsystem 220 is configured to generate the one or more personas associated with the optimized second user among the ranked one or more second users based on ranking of the one or more second users using the artificial intelligence model. In an embodiment, the generated one or more personas associated with the optimized second user may include the one or more persona-based answers corresponding to the one or more questions. In another embodiment, the one or more persona-based answers are generated in at least one of: voice, tone, and style, of the one or more optimized second user.

The plurality of subsystems 110 includes the objective analyzing subsystem 222 that is communicatively connected to the one or more hardware processors 204. The objective analyzing subsystem 222 is configured to analyze the one or more objectives of the one or more first users based on the one or more persona-based answers generated for the one or more questions.

The plurality of subsystems 110 includes the question generation subsystem 224 that is communicatively connected to the one or more hardware processors 204. The question generation subsystem 224 is configured to generate the one or more subsequent questions (e.g., one or more follow-up questions) for the one or more first users to pursue the interaction between the one or more personas and the one or more first users, based on the analysis of one or more objectives of the one or more first users.

The plurality of subsystems 110 includes the guardrails subsystem 226 that is communicatively connected to the one or more hardware processors 204. The guardrails subsystem 226 is configured to control one or more performances (i.e., behavior) and outputs, associated with the artificial intelligence model. For example, the guardrails subsystem 226 is configured to provide transparency of the one or more personas associated with the one or more second users, to the one or more first users. In other words, the one or more persona are annotated as AI representations of the one or more experts and not the real experts/content creators, so that there is full transparency of who the one or more first users are communicating with. The guardrails subsystem 226 is further configured to determine/ensure whether at least one of: the one or more persona-based answers are compliance with one or more answers published by the one or more second users, and the one or more persona-based answers are in at least one of: voice, tone, and style, of the one or more optimized second user.

In an embodiment, the guardrails subsystem 226 is further configured to adapt the one or more second users (i.e., the one or more content creators) to claim their personas and to control the behavior/performance of their personas. These controls may include specific topics the one or more personas should not discuss (opt-out), or specific topics the one or more persona should discuss exclusively (opt-in). In an embodiment, the guardrails subsystem 226 is further configured to significantly reduce hallucinations by restricting the one or more answers to experts who have published work. Further, the guardrails subsystem 226 is configured to optimize the one or more personas based on one or more updated information provided by the one or more second users using at least one of: fine-tuning the artificial intelligence model and configuring one or more techniques including Retrieval Augmented Generation (RAG).

In an embodiment, the guardrails subsystem 226 is configured to define safe zones that are implemented by scrubbing queries and to weed out queries that may not fit the acceptable use standards. In other words, the guardrails subsystem 226 is configured to filter the one or more subsequent questions that are incompliant to one or more acceptable standard criteria. In an embodiment, the guardrails subsystem 226 is configured to ensure that the benefits of personalization are provided to the one or more first users, while ensuring that the user's privacy is maintained, based on at least one of: modifications of the one or more subsequent questions and one or more user controls.

In an embodiment, the guardrails subsystem 226 is further configured to actively monitor that "nothing slips through the cracks" ensuring a constant review and upgrading of the guardrails subsystem 226. In an embodiment, the guardrails subsystem 226 is further configured to ensure the right guardrails are in place based on one or more active feedback from the one or more first users and the one or more second users (e.g., the one or more content creators).

The plurality of subsystems 110 includes the recommendation subsystem 228 that is communicatively connected to the one or more hardware processors 204. The recommendation subsystem 228 is configured to recommend one or more actions associated with the one or more objectives of the one or more first users, based on an interaction between the one or more personas and the one or more first users, upon analyzing the one or more objectives of the one or more first users. The recommendation subsystem 228 is further configured to monitor the one or more actions performed by the one or more first users. The recommendation subsystem 228 is further configured to update the one or more actions associated with the one or more objectives of the one or more first users, based on one or more feedback received from the one or more first users.

For example, if the one or more first users have engaged with the one or more personas associated with the one or more second users on physical fitness and the one or more personas may recommend a specific exercise regimen for the week. The one or more personas follow up with the one or more first users asking how their regimen went, and offering help to modify based on the user's feedback or constraints.

In another example, If a dietician (i.e., an expert) has recommended a particular recipe, the persona of the dietician may reach out to the one or more first users to solicit feedback on whether the recipe worked well, and modify their diet plan, which may also empower the persona to act on behalf of the one or more first users to query environmental factors or other systems to modify their recommendations. In yet another example, if the persona has recommended an outdoor hike for the weekend, the persona may find out that the weather forecast calls for rain, and with no user prompting, modify the recommendation to include indoor weights instead of the outdoor hike and notify the one or more first users.

The plurality of subsystems 110 includes the trust and safety subsystem 230 that is communicatively connected to the one or more hardware processors 204. The trust and safety subsystem 230 is configured to determine whether the one or more questions and the corresponding one or more persona-based answers meet one or more current and future trust expectations of the artificial intelligence based (AI-based) content generation system 104 to provide security to at least one of: the one or more first users and the one or more second users.

The plurality of subsystems 110 includes the training subsystem 232 that is communicatively connected to the one or more hardware processors 204. The training subsystem 232 is configured to obtain one or more data from one or more data sources including at least one of: one or more books, one or more multimedia contents, one or more articles, one or more blog posts, and one or more websites. In an embodiment, the one or more data may include at least one of: one or more titles, one or more authors associated with the one or more second users, and one or more contents. The training subsystem 232 is further configured to train the artificial intelligence (AI) model on the obtained one or more data using a learning algorithm. In an embodiment, the artificial intelligence (AI) model may include at least one of: Large Language Model (LLM), Generative Pre-trained Transformers (GPT), Gemini®, Large Language Model Meta AI (LLAMA), Mistral®, Claude®, and the like.

The plurality of subsystems 110 includes the fine-tuning subsystem 234 that is communicatively connected to the one or more hardware processors 204. The fine-tuning subsystem 234 is configured to fine-tune the trained artificial intelligence (AI) model on one or more task-specific datasets associated with the one or more data to optimize performance of the artificial intelligence (AI) model. The fine-tuning subsystem 234 is further configured to evaluate the trained artificial intelligence (AI) model to assess capabilities of the artificial intelligence (AI) model in at least one of: identifying the one or more second users, generating the one or more subsequent questions, and generating the one or more personas associated with the one or more second users, with one or more persona-based answers for the one or more questions.

The plurality of subsystems 110 includes the output subsystem 236 that is communicatively connected to the one or more hardware processors 204. The output subsystem 236 is configured to provide the output of at least one of: the generated one or more personas associated with the optimized second user, with the one or more persona-based answers, the one or more subsequent questions, and the diversity of the one or more personas based on a diversity of the one or more second users, to the one or more first users through the one or more user interfaces associated with the one or more electronic devices 102.

In an embodiment, if any errors occurred from the artificial intelligence model (e.g., the Large Language Model) or in case of the LLMs inability to answer the questions, the artificial intelligence based (AI-based) content generation system 104 may perform at least one of: error handling in its own, error handling with other similar systems, error handling with the help of the one or more users, and the like.

Figure 3:
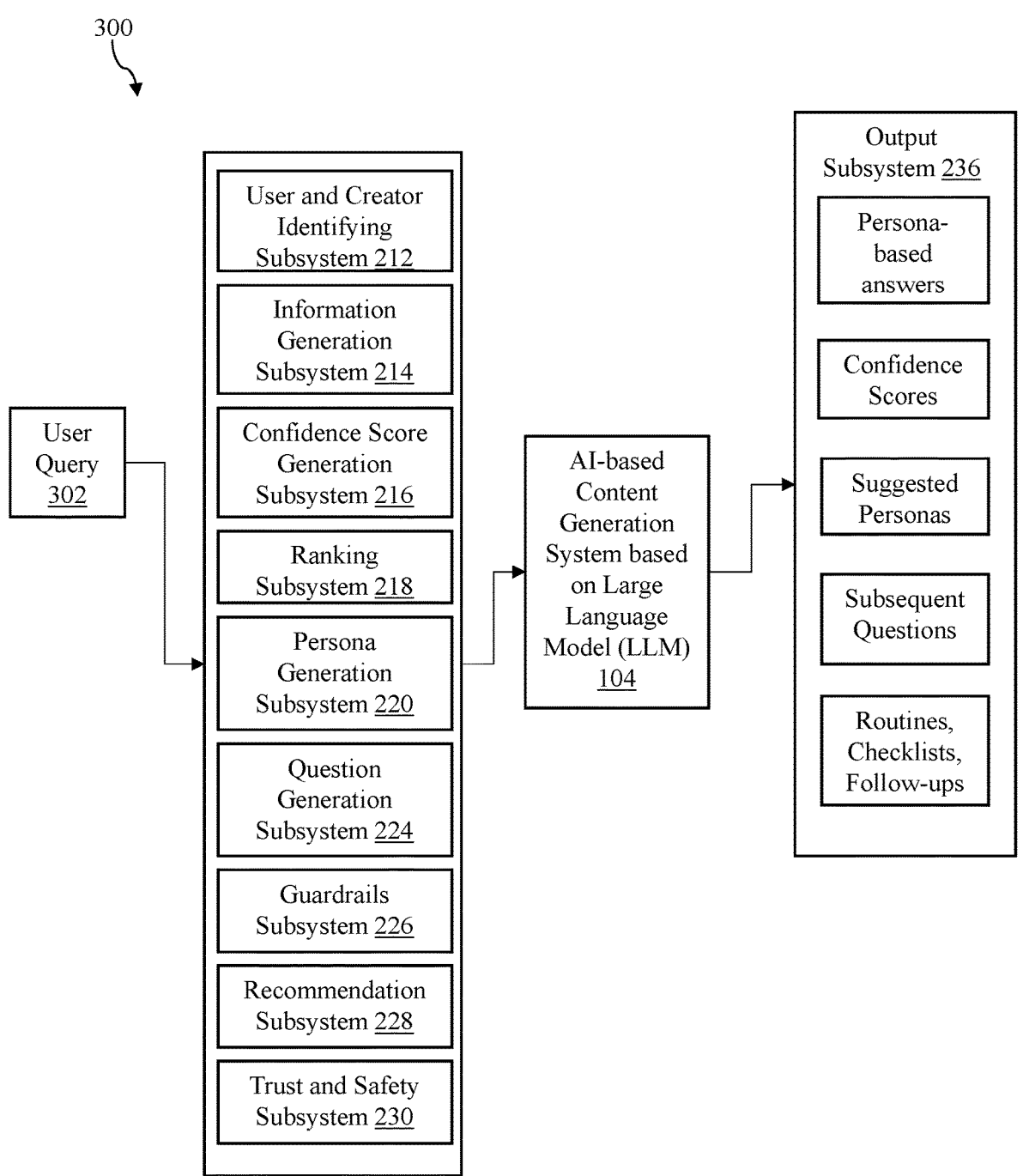
FIG. 3 is an exemplary block diagram of the artificial intelligence based (AI-based) content generation system for generating the one or more persona-based question answers, in accordance with an embodiment of the present disclosure.

FIG. 3 is an exemplary block diagram 300 of the artificial intelligence based (AI-based) content generation system 104 for generating the one or more persona-based question answers, in accordance with an embodiment of the present disclosure. The artificial intelligence based (AI-based) content generation system 104 is configured to obtain the one or more inputs including the one or more questions 304 from the one or more first users. The plurality of subsystems 110 including at least one of: the user and creator identifying subsystem 212, the information generation subsystem 214, the confidence score generation subsystem 216, the ranking subsystem 218, the persona generation subsystem 220, the question generation subsystem 224, the guardrails subsystem 226, the recommendation subsystem 228, and the trust and safety subsystem 230, are configured for generating the one or more persona-based question answers based on the one or more questions 302 inputted by the one or more first users. The detailed explanation of the plurality of subsystems 110 has been elaborated in FIG. 2.

In an embodiment, the plurality of subsystems 110 may include their own static information that provide specific directions to the LLM to generate persona-based question answers. In another embodiment, the plurality of subsystems 110 may be their own learning modules that get better over time, and provide specific directions to the LLM to generate persona-based question answers. In yet another embodiment, the plurality of subsystems 110 may use the LLMs generative ability to come up with information that guide the persona-based question answers. In yet another embodiment, the plurality of subsystems 110 may be configured within the LLM so that the plurality of subsystems 110 are natively served by the LLM. In yet another embodiment, the plurality of subsystems 110 may be configured as separate pieces that may all work together.

In an embodiment, the output subsystem 236 is configured to provide the output of at least one of: one or more persona-based answers provided by the LLM with clear attribution of the answers, other personas who may have a diversity of opinions and answers, the one or more confidence scores for the list of information associated with the one or more second users based on one or more attributes of the one or more second users, and the one or more subsequent questions (e.g., the one or more follow-up questions) that the one or more first users may ask. In an embodiment, the plurality of subsystems 110 may be implemented in at least one of: (a) stand-alone in its own application, so that that the output is usable by the one or more users, (b) included as a part of the LLM output itself, so that the output is usable by the one or more users, and (c) included as an Application Programming Interface (API) so that the output may be used by machines and applications.

FIG. 4 is an exemplary view of a user interface 400 depicting the list of information associated with the one or more second users, being generated based on the one or more criteria associated with the one or more questions, in accordance with an embodiment of the present disclosure. The user interface 400 depicts that the artificial intelligence based (AI-based) content generation system 104 is configured to generate the list of information associated with the one or more second users based on the one or more criteria associated with the one or more inputs. In an embodiment, the list of information with similar or different perspectives/answers may have the diversity criteria that may meet the goal of the wide range of answers including but not limited to: differing opinions, differing styles, surprising answers, delightful answers, and the like.

FIG. 5 is an exemplary view of a user interface 500 depicting that the one or more persona provide the one or more persona-based answers 504 to the one or more first users, in accordance with an embodiment of the present disclosure. The artificial intelligence based (AI-based) content generation system 104 is configured to obtain the one or more inputs including the one or more questions 502 from the one or more first users. The artificial intelligence based (AI-based) content generation system 104 is further configured to generate the one or more personas associated with the optimized second user among the ranked one or more second users based on ranking of the one or more second users using the artificial intelligence model. The one or more personas associated with the optimized second user may provide the one or more persona-based answers 504 corresponding to the one or more questions 502. In an embodiment, the one or more persona-based answers 504 are generated in at least one of: voice, tone, and style, of the one or more optimized second user.

Further, the artificial intelligence based (AI-based) content generation system 104 is configured to automatically generate the one or more subsequent questions (e.g., the one or more follow-up questions) 506 for the one or more first users to pursue the interaction between the one or more personas and the one or more first users, based on the analysis of one or more objectives of the one or more first users.

FIG. 6 is an exemplary view of a user interface 600 depicting that one or more persona provide one or more persona-based answers 604 to the one or more first users for creating a trusted connection with the one or more first users, in accordance with an embodiment of the present disclosure. The user interface 600 depicts that that the one or more persona-based question answers 604 are generated to optimize the user experiences, act on behalf of a brand, a merchant, or an influencer, be a trusted advisor based on adding the one or more personas (e.g., a human layer) and learning from the user's preferences and problems, to build a trusted connection with the user, to guide the users through commercial journeys, and to use the expert's personas to influence, recommend, and close the sale of products and services.

FIG. 7 is a flow chart illustrating an artificial intelligence based (AI-based) content generation method 700 (i.e., a generative artificial intelligence based (Gen AI-based) content generation method) for generating the one or more persona-based question answers to optimize the user experiences based on the one or more personas and the diversity of answers, in accordance with an embodiment of the present disclosure. At step 702, the one or more inputs are obtained from the one or more electronic devices 102 of the one or more first users. In an embodiment, the one or more inputs may include the one or more information related to the one or more questions from the one or more one or more first users.

At step 704, the one or more second users are identified based on the one or more criteria associated with the one or more inputs received from the one or more electronic devices 102 of the one or more first users, by the artificial intelligence model. In an embodiment, the one or more second users are one or more experts (e.g., content creators or organizations under which the content creators are working with or organizations under whose name content is published) responding with one or more persona-based answers to the one or more questions provided by the one or more first users. In an embodiment, the one or more criteria associated with the one or more inputs may include at least one of: the expertise of the one or more second users to answer to the one or more questions, the one or more written materials of the one or more second users in support of the one or more questions, the popularity of the one or more second users, and the ratings of the one or more second users based on historical interactions with the one or more first users in answering the one or more questions.

At step 706, the list of information associated with the one or more second users is generated based on the one or more criteria associated with the one or more inputs. In an embodiment, the list of information associated with the one or more second users may include at least one of: the one or more identical persona-based answers to the one or more questions and the one or more different persona-based answers to the one or more questions.

At step 708, the one or more confidence scores are generated for the list of information associated with the one or more second users based on one or more attributes of the one or more second users using the artificial intelligence model. In an embodiment, the one or more attributes of the one or more second users may include at least one of: the expertise of the one or more second users to answer the one or more questions of the one or more first users, the one or more explicit preferences of inclusion and exclusion of the one or more second users set by the one or more first users, the implicit preferences of the one or more first users learned by the artificial intelligence model, one or more goals and values of at least one of: the one or more organizations and the one or more experts, one or more guidelines set by the one or more organizations, and the one or more optimized practices in the one or more organizations.

At step 710, the one or more second users are ranked based on the generated one or more confidence scores using the artificial intelligence model. At step 712, the one or more personas associated with the optimized second user among the ranked one or more second users, are generated based on ranking of the one or more second users using the artificial intelligence model. the generated one or more personas associated with the optimized second user may include the one or more persona-based answers corresponding to the one or more questions. The one or more persona-based answers are generated based on the content of the one or more second users and in at least one of: voice, tone, and style, of the one or more optimized second user.

At step 714, the one or more objectives of the one or more first users are analyzed based on the one or more persona-based answers generated for the one or more questions. At step 716, the one or more subsequent questions are automatically generated for the one or more first users to pursue the interaction between the one or more personas and the one or more first users, based on the analysis of one or more objectives of the one or more first users by the one or more personas and the artificial intelligence based (AI-based) content generation system.

At step 718, the output of at least one of: the generated one or more personas associated with the optimized second user, with the one or more persona-based answers, the one or more subsequent questions, and the diversity of the one or more personas based on the diversity of the one or more second users, are provided to the one or more first users through one or more user interfaces associated with the one or more electronic devices 102.

The present invention has the following advantages. The present invention with the artificial intelligence based (AI-based) content generation system 104 and method 700 are configured to make generative user journeys more helpful, engaging, and delightful using the one or more personas to answer the one or more questions. The present invention with the artificial intelligence based (AI-based) content generation system 104 is further configured to suggest a diversity of the one or more content creators (e.g., the one or more personas) who may have identical or different opinions on the one or more questions asked by the one or more first users. The present invention with the artificial intelligence based (AI-based) content generation system 104 is further configured to guide the one or more first users through the one or more subsequent questions. The present invention with the artificial intelligence based (AI-based) content generation system 104 is further configured to solve the problem of lack of understanding of where the answers are coming from, lack of diverse opinions, lack of a human face to the answers, lack of relatability to the answers, and to provide an easier navigation of the LLM.

The present invention with the artificial intelligence based (AI-based) content generation system 104 is further configured to attribute the content to the one or more second users (i.e., the content creators) by displaying the creator's names and details, thus ensuring that the one or more creators get their credits for their content. The present invention with the artificial intelligence based (AI-based) content generation system 104 is further configured to provide a path for compensating the one or more creators using a form of sharing revenues, profits or consideration of some forms. This is enabled by attribution of the content to each creator.

The present invention with the artificial intelligence based (AI-based) content generation system 104 is further configured to provide a path for the one or more creators to own their persona, to add the new content along with existing contents, to train the one or more personas, and further to potentially protect new content from being subsumed by the LLM. The present invention with the artificial intelligence based (AI-based) content generation system 104 is further configured to enable the one or more creators to utilize their AI personas to scale their reach and influence. The one or more creators may have number of first users who they influence, but each of the first user may have a specific question. By using the AI personas, the one or more creators may significantly amplify their reach and provide personalized advice to each of the first user.

The present invention with the artificial intelligence based (AI-based) content generation system 104 is further configured to adapt the one or more creators to be able to potentially participate in real or virtual meetups such as "meet the person behind the persona" to engage with their first users. The present invention with the artificial intelligence based (AI-based) content generation system 104 is further configured to adapt the one or more creators to be able to distribute snippets of conversations (with privacy redaction) on their existing social media and website channels to enhance their brands. The present invention with the artificial intelligence based (AI-based) content generation system 104 is further configured to adapt the one or more creators to be able to potentially enhance the content by sharing additional content that is not already subsumed by the LLM. The present invention with the artificial intelligence based (AI-based) content generation system 104 is further configured to adapt the one or more creators to be able to potentially ring-fence their content so that the content is not indexable by the LLM.

The present invention with the artificial intelligence based (AI-based) content generation system 104 is configured to add a human layer to the LLM. The present invention may have the artificial intelligence based (AI-based) content generation method 700 to generate the one or more personas so that the one or more content creators who may answer the one or more questions, are displayed. The artificial intelligence based (AI-based) content generation method 700 may attribute the answers to experts who created the content, thus providing vital context to the first user and ensuring the answers are not faceless. The artificial intelligence based (AI-based) content generation method 700 is configured to provide incentives to the one or more creators to create new content with the right attribution and protection mechanisms.

The artificial intelligence based (AI-based) content generation method 700 is further configured to provide context and offer the diversity of opinions to allow the first user to make a well-formed decision about the question they had, versus forcing a singular opinion on the first user devoid of context. On the creator side, the attribution paves the way for recognition and reward for creating the content, versus taking away value from the one or more creators. Further, the present invention may be used in many end user products including but not limited to mobile phones, computers, automobiles, and tablets. The present invention may be used in consumer applications (where a first user anywhere in the world may want to seek information that is related to or best answered by personas), and enterprise applications (where the first user within a company may want to get answers with sources within or outside the company clearly attributed to the responses).

The present invention is able to discover, manage, surface personas and persona-based answers thus benefiting both the one or more first users and the one or more creators who are represented by the personas. The present invention with the artificial intelligence based (AI-based) content generation system 104 is configured to provide the one or more persona-based answers to the one or more questions based on the one or more persona and the questions. In an embodiment, in case of commercial questions, the one or more first users may be able to utilize the LLM recommendations directly or through third parties.

The present invention may be used as at least one of: (a) a standalone application configured on top of an existing LLM, (b) firmware embedded into devices, including devices including computers and mobile phones, and (c) embeddable application or a plug-in into another application.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk.

Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the artificial intelligence based (AI-based) content generation system 104 either directly or through intervening I/O controllers. Network adapters may also be coupled to the artificial intelligence based (AI-based) content generation system 104 to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/artificial intelligence based (AI-based) content generation system 104 in accordance with the embodiments herein. The artificial intelligence based (AI-based) content generation system 104 herein comprises at least one processor or central processing unit (CPU). The CPUs are interconnected via the system bus 208 to various devices including at least one of: a random-access memory (RAM), read-only memory (ROM), and an input/output (I/O) adapter. The I/O adapter can connect to peripheral devices, including at least one of: disk units and tape drives, or other program storage devices that are readable by the artificial intelligence based (AI-based) content generation system 104. The artificial intelligence based (AI-based) content generation system 104 can read the inventive instructions on the program storage devices and follow these instructions to execute the methodology of the embodiments herein.

The artificial intelligence based (AI-based) content generation system 104 further includes a user interface adapter that connects a keyboard, mouse, speaker, microphone, and/or other user interface devices including a touch screen device (not shown) to the bus to gather user input. Additionally, a communication adapter connects the bus to a data processing network, and a display adapter connects the bus to a display device which may be embodied as an output device including at least one of: a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that are issued on an application based here on. Accordingly, the embodiments of the present invention are intended to be illustrative, but not limiting, of the scope of the invention, which is set forth in the following claims.

What is claimed is:

1. An artificial intelligence based (AI-based) content generation method for generating one or more persona-based question answers to optimize user experiences based on one or more personas and diversity of answers, the artificial intelligence based (AI-based) content generation method comprising:

obtaining, by one or more hardware processors, one or more inputs from one or more electronic devices of one or more first users, wherein the one or more inputs comprise one or more information related to one or more questions from the one or more first users;

identifying, by the one or more hardware processors, one or more second users based on one or more criteria associated with the one or more inputs received from the one or more electronic devices of the one or more first users, by an artificial intelligence model, wherein the one or more second users are one or more experts responding with one or more persona-based answers to the one or more questions provided by the one or more first users, and wherein the one or more criteria associated with the one or more inputs comprise at least one of: expertise of the one or more second users to answer to the one or more questions, one or more written materials of the one or more second users in support of the one or more questions, popularity of the one or more second users, and ratings of the one or more second users based on historical interactions with the one or more first users in answering the one or more questions;

generating, by the one or more hardware processors, a list of information associated with the one or more second users based on the one or more criteria associated with the one or more inputs, wherein the list of information associated with the one or more second users comprise at least one of one or more identical persona-based answers to the one or more questions and one or more different persona-based answers to the one or more questions;

generating, by the one or more hardware processors, one or more confidence scores for the list of information associated with the one or more second users based on one or more attributes of the one or more second users using the artificial intelligence model, wherein the one or more attributes of the one or more second users comprise at least one of: expertise of the one or more second users to answer the one or more questions of the one or more first users, one or more explicit preferences of inclusion and exclusion of the one or more second users set by the one or more first users, an implicit preferences of the one or more first users learned by the artificial intelligence model, one or more goals and values of at least one of: one or more organizations and the one or more experts, one or more guidelines set by the one or more organizations, and one or more optimized practices in the one or more organizations;

ranking, by the one or more hardware processors, the one or more second users based on the generated one or more confidence scores using the artificial intelligence model;

generating, by the one or more hardware processors, the one or more personas associated with an optimized second user among the ranked one or more second users based on ranking of the one or more second users using the artificial intelligence model, wherein the generated one or more personas associated with the optimized second user comprises the one or more persona-based answers corresponding to the one or more questions, and wherein the one or more persona-based answers are generated based on the content of the one or more second users and in at least one of voice, tone, and style, of the one or more optimized second user;

analyzing, by the one or more hardware processors, one or more objectives of the one or more first users based on the one or more persona-based answers generated for the one or more questions;

automatically generating, by the one or more hardware processors, one or more subsequent questions for the one or more first users to pursue an interaction between the one or more personas and the one or more first users, based on the analysis of one or more objectives of the one or more first users by the one or more personas and the artificial intelligence based (AI-based) content generation system;

providing, by the one or more hardware processors, an output of at least one of: the generated one or more personas associated with the optimized second user, with the one or more persona-based answers, the one or more subsequent questions, and the diversity of the one or more personas based on a diversity of the one or more second users, to the one or more first users through one or more user interfaces associated with the one or more electronic devices; and training, by the one or more hardware processors, the artificial intelligence (AI) model, by:

obtaining, by the one or more hardware processors, one or more data from one or more data sources comprising at least one of one or more books, one or more multimedia contents, one or more articles, one or more blog posts, one or more social media posts, and one or more websites, wherein the one or more data comprise at least one of: one or more titles, one or more authors associated with the one or more second users, and one or more contents;

training, by the one or more hardware processors, the artificial intelligence (AI) model on the obtained one or more data using a learning algorithm;

fine-tuning, by the one or more hardware processors, the trained artificial intelligence (AI) model on one or more task-specific datasets associated with the one or more data to optimize performance of the artificial intelligence (AI) model; and evaluating, by the one or more hardware processors, the trained artificial intelligence (AI) model to assess capabilities of the artificial intelligence (AI) model in at least one of: identifying the one or more second users, generating the one or more subsequent questions, and generating the one or more personas associated with the one or more second users, with the one or more persona-based answers for the one or more questions.

2. The artificial intelligence based (AI-based) content generation method of claim 1, further comprising:

upon analyzing the one or more objectives of the one or more first users, recommending, by the one or more hardware processors, one or more actions associated with the one or more objectives of the one or more first users, based on an interaction between the one or more personas and the one or more first users;

monitoring, by the one or more hardware processors, the one or more actions performed by the one or more first users; and updating, by the one or more hardware processors, the one or more actions associated with the one or more objectives of the one or more first users, based on one or more feedback received from the one or more first users.

3. The artificial intelligence based (AI-based) content generation method of claim 1, further comprising controlling, by the one or more hardware processors, one or more performances and outputs, associated with the artificial intelligence model.

4. The artificial intelligence based (AI-based) content generation method of claim 3, wherein controlling the one or more performances and outputs, associated with the artificial intelligence model, comprises at least one of:

providing, by the one or more hardware processors, transparency of the one or more personas associated with the one or more second users, to the one or more first users;

determining, by the one or more hardware processors, whether at least one of: the one or more persona-based answers are in compliance with one or more answers published by the one or more second users, and the one or more persona-based answers are in at least one of: the voice, the tone, and the style, of the one or more optimized second user;

controlling, by the one or more hardware processors, one or more performances of the one or more personas, wherein controlling the one or more performances of the one or more personas comprises constraining the one or more personas to provide information associated with the one or more persona-based answers to the one or more first users;

optimizing, by the one or more hardware processors, the one or more personas based on one or more updated information provided by the one or more second users using at least one of: fine-tuning the artificial intelligence model and configuring one or more techniques comprising Retrieval Augmented Generation (RAG) technique;

filtering, by the one or more hardware processors, the one or more subsequent questions that are incompliant to one or more acceptable standard criteria;

determining, by the one or more hardware processors, whether one or more benefits are provided to the one or more first users based on at least one of: modifications of the one or more subsequent questions and one or more user controls; and determining, by the one or more hardware processors, whether the one or more performances of the artificial intelligence model are in control based on one or more feedback received from at least one of: the one or more first users and the one or more second users, wherein the one or more first users comprise one or more end users receiving the one or more persona-based answers based on the one or more questions, and wherein the one or more second users comprise one or more creators creating one or more contents associated with the one or more persona-based answers.

5. The artificial intelligence based (AI-based) content generation method of claim 1, further comprising:

determining, by the one or more hardware processors, whether the one or more questions and the corresponding one or more persona-based answers meet one or more current and future safety and trust expectations of an artificial intelligence based (AI-based) content generation system to provide security to at least one of: the one or more first users and the one or more second users; and creating, by the one or more hardware processors, a trusted connection with the one or more first users, guiding the one or more first users and utilizing the one or more personas of the one or more second users, to influence, recommend and close a sale of one or more products and services, based on the one or more personas and trained data associated with preferences and problems associated with the one or more first users.

6. An artificial intelligence based (AI-based) content generation system for generating one or more persona-based question answers to optimize user experiences, the artificial intelligence based (AI-based) content generation system comprising:

one or more hardware processors;

a memory coupled to the one or more hardware processors, wherein the memory comprises a plurality of subsystems in form of programmable instructions executable by the one or more hardware processors, and wherein the plurality of subsystems comprises:

an input obtaining subsystem configured to obtain one or more inputs from one or more electronic devices of one or more first users, wherein the one or more inputs comprise one or more information related to one or more questions from the one or more first users;

an user identifying subsystem configured to identify one or more second users based on one or more criteria associated with the one or more inputs received from the one or more electronic devices of the one or more first users, by an artificial intelligence model, wherein the one or more second users are one or more experts responding with one or more persona-based answers to the one or more questions provided by the one or more first users, and wherein the one or more criteria associated with the one or more inputs comprise at least one of:

expertise of the one or more second users to answer to the one or more questions, one or more written materials of the one or more second users in support of the one or more questions, popularity of the one or more second users, and ratings of the one or more second users based on historical interactions with the one or more first users in answering the one or more questions;

an information generation subsystem configured to generate a list of information associated with the one or more second users based on the one or more criteria associated with the one or more inputs, wherein the list of information associated with the one or more second users comprise at least one of: one or more identical persona-based answers to the one or more questions and one or more different persona-based answers to the one or more questions;

a confidence score generation subsystem configured to generate one or more confidence scores for the list of information associated with the one or more second users based on one or more attributes of the one or more second users using the artificial intelligence model, wherein the one or more attributes of the one or more second users comprise at least one of expertise of the one or more second users to answer the one or more questions of the one or more first users, one or more explicit preferences of inclusion and exclusion of the one or more second users set by the one or more first users, an implicit 35 preferences of the one or more first users learned by the artificial intelligence model, one or more goals and values of at least one of: one or more organizations and the one or more experts, one or more guidelines set by the one or more organizations, and one or more optimized practices in the one or more organizations;

a ranking subsystem configured to rank the one or more second users based on the generated one or more confidence scores using the artificial intelligence model;

a persona generation subsystem configured to generate one or more personas associated with an optimized second user among the ranked one or more second users based on ranking of the one or more second users using the artificial intelligence model, wherein the generated one or more personas associated with the optimized second user comprises the one or more persona-based answers corresponding to the one or more questions, and wherein the one or more persona-based answers are generated based on the content of the one or more second users and in at least one of: voice, tone, and style, of the one or more optimized second user;

an objective analyzing subsystem configured to analyze one or more objectives of the one or more first users based on the one or more persona-based answers generated for the one or more questions;

a question generation subsystem configured to automatically generate one or more subsequent questions for the one or more first users to pursue and continue an interaction between the one or more personas and the one or more first users, based on the analysis of one or more objectives of the one or more first users by the one or more personas and the artificial intelligence based (AI-based) content generation system; and an output subsystem configured to provide an output of at least one of: the generated one or more personas associated with the optimized second user, with the one or more persona-based answers, and the one or more subsequent questions, and the diversity of the one or more personas based on a diversity of the one or more second users, to the one or more first users through one or more user interfaces associated with the one or more electronic devices; and a training subsystem configured to:

obtain one or more data from one or more data sources comprising at least one of one or more books, one or more multimedia contents, one or more articles, one or more blog posts, one or more social media posts, and one or more websites, wherein the one or more data comprise at least one of one or more titles, one or more authors associated with the one or more second users, and one or more contents;

train the artificial intelligence (AI) model on the obtained one or more data using a learning algorithm; and a fine-tuning subsystem configured to:

fine-tune the trained artificial intelligence (AI) model on one or more task-specific datasets associated with the one or more data to optimize performance of the artificial intelligence (AI) model; and evaluate the trained artificial intelligence (AI) model to assess capabilities of the artificial intelligence (AI) model in at least one of: identifying the one or more second users, generating the one or more subsequent questions, and generating the one or more personas associated with the one or more second users, with the one or more persona-based answers for the one or more questions.

7. The artificial intelligence based (AI-based) content generation system of claim 6, further comprising a recommendation subsystem configured to:

recommend one or more actions associated with the one or more objectives of the one or more first users, based on an interaction between the one or more personas and the one or more first users, upon analyzing the one or more objectives of the one or more first users;

monitor the one or more actions performed by the one or more first users; and update the one or more actions associated with the one or more objectives of the one or more first users, based on one or more feedback received from the one or more first users.

8. The artificial intelligence based (AI-based) content generation system of claim 6, further comprising a guardrails subsystem configured to control one or more performances and outputs, associated with the artificial intelligence model.

9. The artificial intelligence based (AI-based) content generation system of claim 8, wherein in controlling the one or more performances and outputs, associated with the artificial intelligence model, the guardrails subsystem is configured to:

provide transparency of the one or more personas associated with the one or more second users, to the one or more first users;

determine whether at least one of: the one or more persona-based answers are in compliance with one or more answers published by the one or more second users, and the one or more persona-based answers are in at least one of: the voice, the tone, and the style, of the one or more optimized second user;

control one or more performances of the one or more personas, wherein controlling the one or more performances of the one or more personas comprises constraining the one or more personas to provide information associated with the one or more persona-based answers to the one or more first users;

optimize the one or more personas based on one or more updated information provided by the one or more second users using at least one of: fine-tuning the artificial intelligence model and configuring one or more techniques comprising Retrieval Augmented Generation (RAG) technique;

filter the one or more subsequent questions that are incompliant to one or more acceptable standard criteria;

determine whether one or more benefits are provided to the one or more first users based on at least one of: modifications of the one or more subsequent questions and one or more user controls; and determine whether the one or more performances of the artificial intelligence model are in control based on one or more feedback received from at least one of: the one or more first users and the one or more second users, wherein the one or more first users comprise one or more end users receiving the one or more persona-based answers based on the one or more questions, and wherein the one or more second users comprise one or more creators creating one or more contents associated with the one or more persona-based answers.

10. The artificial intelligence based (AI-based) content generation system of claim 6, further comprising a trust and safety sub-system configured to determine whether the one or more questions and the corresponding one or more persona-based answers meet one or more current and future safety and trust expectations of an artificial intelligence based (AI-based) content generation system to provide security to at least one of: the one or more first users and the one or more second users, wherein the trust and safety sub-system is further configured as a trusted advisor to build a trusted connection with the one or more first users, guide the one or more first users and to utilize the one or more personas of the one or more second users, to influence, recommend and close a sale of one or more products and services, based on the one or more personas and trained data associated with preferences and problems associated with the one or more first users.

11. A non-transitory computer-readable storage medium having instructions stored therein that when executed by a hardware processor, cause the processor to execute operations of:

obtaining one or more inputs from one or more electronic devices of one or more first users, wherein the one or more inputs comprise one or more information related to one or more questions from the one or more first users;

identifying one or more second users based on one or more criteria associated with the one or more inputs received from the one or more electronic devices of the one or more first users, by an artificial intelligence model, wherein the one or more second users are one or more experts responding with one or more persona-based answers to the one or more questions provided by the one or more first users, and wherein the one or more criteria associated with the one or more inputs comprise at least one of expertise of the one or more second users to answer to the one or more questions, one or more written materials of the one or more second users in support of the one or more questions, popularity of the one or more second users, and ratings of the one or more second users based on historical interactions with the one or more first users in answering the one or more questions;

generating a list of information associated with the one or more second users based on the one or more criteria associated with the one or more inputs, wherein the list of information associated with the one or more second users comprise at least one of one or more identical persona-based answers to the one or more questions and one or more different persona-based answers to the one or more questions;

generating one or more confidence scores for the list of information associated with the one or more second users based on one or more attributes of the one or more second users using the artificial intelligence model, wherein the one or more attributes of the one or more second users comprise at least one of: expertise of the one or more second users to answer the one or more questions of the one or more first users, one or more explicit preferences of inclusion and exclusion of the one or more second users set by the one or more first users, an implicit preferences of the one or more first users learned by the artificial intelligence model, one or more goals and values of at least one of one or more organizations and the one or more experts, one or more guidelines set by the one or more organizations, and one or more optimized practices in the one or more organizations;

ranking the one or more second users based on the generated one or more confidence scores using the artificial intelligence model;

generating one or more personas associated with an optimized second user among the ranked one or more second users based on ranking of the one or more second users using the artificial intelligence model, wherein the generated one or more personas associated with the 39 optimized second user comprises the one or more persona-based answers corresponding to the one or more questions, and wherein the one or more persona-based answers are generated based on the content of the one or more second users and in at least one of voice, tone, and style, of the one or more optimized second user;

analyzing one or more objectives of the one or more first users based on the one or more persona-based answers generated for the one or more questions;

automatically generating one or more subsequent questions for the one or more first users to pursue an interaction between the one or more personas and the one or more first users, based on the analysis of one or more objectives of the one or more first users by the one or more personas and the artificial intelligence based (AI-based) content generation system;

providing an output of at least one of the generated one or more personas associated with the optimized second user, with the one or more persona-based answers, and the one or more subsequent questions, and the diversity of the one or more personas based on a diversity of the one or more second users, to the one or more first users through one or more user interfaces associated with the one or more electronic devices;

obtaining one or more data from one or more data sources comprising at least one of one or more books, one or more multimedia contents, one or more articles, one or more blog posts, one or more social media posts, and one or more websites, wherein the one or more data comprise at least one of: one or more titles, one or more authors associated with the one or more second users, and one or more contents;

training the artificial intelligence (AI) model on the obtained one or more data using a learning algorithm;

fine-tuning the trained artificial intelligence (AI) model on one or more task-specific datasets associated with the one or more data to optimize performance of the artificial intelligence (AI) model; and evaluating the trained artificial intelligence (AI) model to assess capabilities of the artificial intelligence (AI) model in at least one of: identifying the one or more second users, generating the one or more subsequent questions, and generating the one or more personas associated with the one or more second users, with the one or more persona-based answers for the one or more questions.

12. The non-transitory computer-readable storage medium of claim 11, further comprising:

upon analyzing the one or more objectives of the one or more first users, recommending one or more actions associated with the one or more objectives of the one or more first users, based on an interaction between the one or more personas and the one or more first users;

monitoring the one or more actions performed by the one or more first users; and updating the one or more actions associated with the one or more objectives of the one or more first users, based on one or more feedback received from the one or more first users.

13. The non-transitory computer-readable storage medium of claim 11, further comprising controlling one or more performances and outputs, associated with the artificial intelligence model, wherein controlling the one or more performances and outputs, associated with the artificial intelligence model, comprises at least one of:

providing transparency of the one or more personas associated with the one or more second users, to the one or more first users;

determining whether at least one of: the one or more persona-based answers are in compliance with one or more answers published by the one or more second users, and the one or more persona-based answers are in at least one of: the voice, the tone, and the style, of the one or more optimized second user;

controlling one or more performances of the one or more personas, wherein controlling the one or more performances of the one or more personas comprises constraining the one or more personas to provide information associated with the one or more persona-based answers to the one or more first users;

optimizing the one or more personas based on one or more updated information provided by the one or more second users using at least one of: fine-tuning the artificial intelligence model and configuring one or more techniques comprising techniques comprising Retrieval Augmented Generation (RAG) technique;

filtering the one or more subsequent questions that are incompliant to one or more acceptable standard criteria;

determining whether one or more benefits are provided to the one or more first users based on at least one of: modifications of the one or more subsequent questions and one or more user controls; and determining whether the one or more performances of the artificial intelligence model are in control based on one or more feedback received from at least one of: the one or more first users and the one or more second users.

14. The non-transitory computer-readable storage medium of claim 11, further comprising determining whether the one or more questions and the corresponding one or more persona-based answers meet one or more current and future safety and trust expectations of an artificial intelligence based (AI-based) content generation system to provide security to at least one of the one or more users and the one or more second users.

* * * * *